United States Patent
Matsuda et al.

(10) Patent No.: US 8,828,549 B2
(45) Date of Patent: *Sep. 9, 2014

(54) INTERLAYER FOR LAMINATED GLASS AND LAMINATED GLASS

(71) Applicant: Sekisui Chemical Co., Ltd., Osaka (JP)

(72) Inventors: Shouta Matsuda, Osaka (JP); Kozo Nakamura, Osaka (JP); Michio Shimamoto, Osaka (JP); Sinyul Yang, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,009

(22) Filed: Sep. 6, 2013

(65) Prior Publication Data

US 2014/0000977 A1    Jan. 2, 2014

Related U.S. Application Data

(63) Continuation of application No. 13/062,055, filed as application No. PCT/JP2009/067076 on Sep. 30, 2009, now Pat. No. 8,551,621.

(30) Foreign Application Priority Data

Sep. 30, 2008  (JP) .................................. 2008-254700
Dec. 19, 2008  (JP) .................................. 2008-324518
Jul. 10, 2009  (JP) .................................. 2009-163995

(51) Int. Cl.
| | | |
|---|---|---|
| B32B 17/10 | (2006.01) | |
| B32B 27/42 | (2006.01) | |
| B32B 27/08 | (2006.01) | |
| C08K 5/00 | (2006.01) | |
| C08K 5/103 | (2006.01) | |

(52) U.S. Cl.
CPC ......... *B32B 17/10761* (2013.01); *C08K 5/0016* (2013.01); *C08K 5/103* (2013.01)
USPC ............ 428/436; 428/437; 428/524; 428/525

(58) Field of Classification Search
USPC .......... 428/436, 437, 524, 525; 524/306, 308, 524/557
See application file for complete search history.

(56) References Cited

U.S. PATENT DOCUMENTS

| | | | |
|---|---|---|---|
| 3,920,878 A | 11/1975 | Fariss et al. | 428/437 |
| 5,340,654 A | 8/1994 | Ueda et al. | 427/437 |
| 6,903,152 B2 | 6/2005 | Toyama et al. | 524/403 |
| 7,842,395 B2 | 11/2010 | Lu et al. | 428/525 |
| 8,012,612 B2 | 9/2011 | Hasegawa | 428/702 |
| 2003/0139520 A1 | 7/2003 | Toyama et al. | 524/503 |
| 2006/0110593 A1 | 5/2006 | Fukatani et al. | 428/328 |
| 2007/0093581 A1 | 4/2007 | Toyama et al. | 524/394 |
| 2009/0162671 A1 | 6/2009 | Marumoto | 428/427 |

FOREIGN PATENT DOCUMENTS

| | | |
|---|---|---|
| CN | 1898175 | 1/2007 |
| CN | 101124176 | 2/2008 |
| CN | 101128403 | 2/2008 |
| EP | 0 710 545 | 5/1996 |
| EP | 1 281 690 | 2/2003 |
| EP | 2 025 651 | 2/2009 |
| JP | 5-229049 | 9/1993 |
| JP | 5-330864 | 12/1993 |
| JP | 7-81984 | 3/1995 |
| JP | 9-40444 | 2/1997 |
| JP | 11-209150 | 8/1999 |
| JP | 2001-316140 | 11/2001 |
| JP | 2006-248826 | 9/2006 |
| JP | 2007-70200 | 3/2007 |
| JP | 2007-253469 | 10/2007 |
| WO | 2007/142095 | 12/2007 |

OTHER PUBLICATIONS

International Search Report issued Dec. 8, 2009 in International (PCT) Application No. PCT/JP2009/067076.
Extended European Search Report issued Mar. 5, 2012 in corresponding European Application No. EP 09817833.8.
Database WPI, Week 199627, Thomson Scientific, London, GB; AN 1996-263717, XP002670147 & JP 8 109048 A (Sekisui Chem Ind Co Ltd), Apr. 30, 1996.

*Primary Examiner* — Sheeba Ahmed
(74) *Attorney, Agent, or Firm* — Wenderoth, Lind & Ponack, L.L.P.

(57) ABSTRACT

The present invention provides an interlayer film for laminated glass, that exhibits an excellent sound-insulating performance for solid-borne sound in an environment at or below 0° C. Another object is to provide laminated glass that is obtained using this interlayer film for laminated glass. The present invention is an interlayer film for laminated glass, that has a sound-insulating layer for which a temperature T1, which is the temperature that gives the maximum value of tan δ at a frequency of 1 Hz, is in the range from −30° C. to 0° C.

16 Claims, No Drawings

INTERLAYER FOR LAMINATED GLASS AND LAMINATED GLASS

TECHNICAL FIELD

The present invention relates to an interlayer film for laminated glass, that exhibits an excellent sound-insulating performance for solid-borne sound in an environment at or below 0° C. The present invention also relates to a laminated glass that is obtained using this interlayer film for laminated glass.

BACKGROUND ART

Laminated glass is very safe because it undergoes little ejection of glass fragments even when fractured by an external impact. As a consequence, laminated glass is widely employed as window glass in aircraft, buildings, vehicles such as automobiles, and so forth. An example of laminated glass is laminated glass provided by interposing, for example, an interlayer film for laminated glass comprising a plasticizer and a polyvinyl acetal resin, e.g., a polyvinyl butyral resin and so forth, between at least a pair of glass sheets and laminating and converting into a single body.

Reducing the thickness of laminated glass has been investigated in recent years in order to reduce the weight of laminated glass. A problem here, however, has been that a reduction in the thickness of laminated glass is associated with a reduction in the sound-insulating performance. When such a laminated glass is employed for the windshield, for example, of an automobile, a satisfactory sound-insulating performance is not obtained in the sound range at approximately 5000 Hz, e.g., wind noise, wiper operating noise, and so forth.

To counter this problem, Patent Document 1 discloses a laminated glass that is provided with a plurality of glass sheets and an interlayer film interposed within this plurality of glass sheets. This interlayer film has a sound-insulating layer comprising a polyvinyl acetal resin having a degree of acetalation of 60 to 85 mol %, an alkali metal salt or an alkaline-earth metal salt, and a plasticizer, wherein the plasticizer content is more than 30 parts by mass with respect to 100 parts by mass of the polyvinyl acetal resin and the content of the alkali metal salt or alkaline-earth metal salt is 0.001 to 1.0 part by mass with respect to 100 parts by mass of the polyvinyl acetal resin.

The laminated glass disclosed by Patent Document 1 is regarded as having an excellent sound-insulating performance. However, there exist both air-borne sound, e.g., vehicle noise, horn noise, and so forth, and solid-borne sound, e.g., sound due to the vibration of the vehicle engine and so forth, and the laminated glass described in Patent Document 1 has an inferior sound-insulating performance for solid-borne sound in an environment at or below 0° C.

Patent Document 1: Japanese Kokai Publication 2007-070200 (JP-A 2007-070200)

DISCLOSURE OF THE INVENTION

An object of the present invention is to provide an interlayer film for laminated glass, that exhibits an excellent sound-insulating performance for solid-borne sound in an environment at or below 0° C. A further object of the present invention is to provide laminated glass that is obtained using this interlayer film for laminated glass.

The present invention is an interlayer film for laminated glass, that has a sound-insulating layer for which the temperature $T_1$, which is the temperature that gives the maximum value of tan δ at a frequency of 1 Hz, is in the range from −30° C. to 0° C.

A detailed explanation of the present invention is provided in the following.

In this Description, tan δ denotes the value of the loss tangent obtained by a dynamic viscoelastic measurement. Tan δ can be measured in the present invention by the following method.

A test sheet (diameter=8 mm) is fabricated using the obtained interlayer film for laminated glass. Tan δ can be measured by measuring the dynamic viscoelasticity of this test sheet by a temperature sweep method for measuring the dynamic viscoelasticity using a shear procedure at a rate of temperature rise of 3° C./minute, a frequency of 1 Hz, and a strain rate of 1.0%. The aforementioned temperature that gives the maximum value of tan δ denotes the temperature at which the maximum value of the obtained loss tangent appears. This temperature that gives the maximum value of tan δ can be measured using, for example, a viscoelasticity measurement instrument ("ARES" manufactured by Rheometric Scientific Inc.).

The interlayer film for laminated glass of the present invention has a sound-insulating layer for which the temperature $T_1$ giving the maximum value of tan δ at a frequency of 1 Hz is in the range from −30° C. to 0° C. When the temperature $T_1$ giving the maximum tan δ value for the sound-insulating layer is less than −30° C., the interlayer film for laminated glass will have a reduced strength; when this temperature exceeds 0° C., the sound-insulating performance for solid-borne sound in an environment at or below 0° C. is reduced. A more preferred lower limit for the temperature $T_1$ giving the maximum tan δ value for the sound-insulating layer is −25° C., and a more preferred upper limit is −5° C. An even more preferred lower limit is −22° C. and an even more preferred upper limit is −6° C., and a particularly preferred lower limit is −18° C. and a particularly preferred upper limit is −10° C.

The following two embodiments are examples of a sound-insulating layer for which the temperature $T_1$ that gives the maximum tan δ value is in the range specified above.

The first embodiment is a sound-insulating layer that contains 71 parts by weight or more of plasticizer with respect to 100 parts by weight of polyvinyl acetal resin that has 3 or 4 carbons in the acetal group.

The second embodiment is a sound-insulating layer that contains 50 parts by weight or more of plasticizer with respect to 100 parts by weight of polyvinyl acetal resin that has 5 or more carbons in the acetal group.

These embodiments are particularly described in the following.

The sound-insulating layer of the first embodiment contains 71 parts by weight or more of plasticizer with respect to 100 parts by weight of polyvinyl acetal resin that has 3 or 4 carbons in the acetal group (also referred to hereafter as "polyvinyl acetal resin A"). The present inventors discovered that with a sound-insulating layer that contains polyvinyl acetal resin and large amounts of plasticizer, the glass-transition temperature is sufficiently lowered that the temperature $T_1$ giving the maximum tan δ value at a frequency of 1 Hz can be adjusted into the range from −30° C. to 0° C. Because the sound-insulating layer of this first embodiment contains large amounts of plasticizer with respect to the polyvinyl acetal resin, it exhibits an excellent sound-insulating performance for solid-borne sound even in an environment at 0° C. or below.

The aforementioned polyvinyl acetal resin A can be produced by the acetalation of a polyvinyl alcohol with an aldehyde.

The acetal group present in the aforementioned polyvinyl acetal resin A has 3 or 4 carbons. Thus, the aldehyde used to produce this polyvinyl acetal resin A is an aldehyde having 3 or 4 carbons. When the acetal group in polyvinyl acetal resin A contains fewer than 3 carbons, the glass-transition temperature is not adequately lowered and the sound-insulating performance for solid-borne sound in an environment at 0° C. or below may be reduced.

The aldehyde having 3 or 4 carbons can be exemplified by propionaldehyde, n-butylaldehyde, and isobutylaldehyde. n-butylaldehyde is preferred among the preceding. Each of these aldehydes may be used alone or two or more kinds of these may be used in combination.

A preferred lower limit on the quantity of the acetyl group in polyvinyl acetal resin A is 15 mol %. When the quantity of acetyl group in polyvinyl acetal resin A is less than 15 mol %, the compatibility between the plasticizer and polyvinyl acetal resin A is reduced and the plasticizer may then bleed out. There is no particular upper limit on the quantity of acetyl group in polyvinyl acetal resin A, but the practical upper limit is 30 mol %. When the quantity of the acetyl group in polyvinyl acetal resin A exceeds 30 mol %, the reactivity between the aforementioned polyvinyl alcohol and the aldehyde is substantially reduced and the production of the polyvinyl acetal resin may then become quite problematic. A more preferred lower limit for this acetyl group quantity is 17 mol % and a more preferred upper limit is 25 mol %, while an even more preferred lower limit is 17.5 mol % and an even more preferred upper limit is 22 mol %.

A preferred upper limit on the quantity of the hydroxyl group in polyvinyl acetal resin A is 21.5 mol %. When the quantity of hydroxyl group in polyvinyl acetal resin A exceeds 21.5 mol %, the compatibility between the plasticizer and polyvinyl acetal resin A is reduced and the plasticizer may then bleed out. There is no particular lower limit on the quantity of hydroxyl group in polyvinyl acetal resin A, but the practical lower limit is 10 mol %. A more preferred upper limit on this quantity of hydroxyl group is 20 mol % and an even more preferred upper limit is 18.5 mol %.

A preferred lower limit on the average degree of polymerization of polyvinyl acetal resin A is 500 and a preferred upper limit is 5000. The penetration resistance of the laminated glass may decline when the average degree of polymerization of polyvinyl acetal resin A is less than 500. Molding of the interlayer film for laminated glass maybe quite problematic when the average degree of polymerization of polyvinyl acetal resin A exceeds 5000. A more preferred lower limit for the average degree of polymerization of polyvinyl acetal resin A is 800, while a more preferred upper limit is 3500 and an even more preferred upper limit is 3000.

In addition, in order to prevent sheet slippage in the obtained laminated glass, the average degree of polymerization of polyvinyl acetal resin A is preferably 2600 or more and more preferably is 2700 or more. This sheet slippage refers to the slippage or creep of one glass sheet relative to another glass sheet due to the weight of the glass sheets when propped up laminated glass is stored in a high temperature ambient.

The aforementioned plasticizer is not particularly limited and can be exemplified by organic ester plasticizers such as monobasic organic acid esters and polybasic organic acid esters and by phosphate plasticizers such as organic phosphate plasticizers and organic phosphite plasticizers.

The monobasic organic acid ester is not particularly limited and can be exemplified by the glycol esters obtained by the reaction of a glycol, e.g., triethylene glycol, tetraethylene glycol, tripropylene glycol, and so forth, with a monobasic organic acid such as butyric acid, isobutyric acid, caproic acid, 2-ethylbutyric acid, heptylic acid, n-octylic acid, 2-ethylhexylic acid, pelargonic acid (n-nonylic acid), decylic acid, and so forth.

The polybasic organic acid ester is not particularly limited and can be exemplified by ester compounds between a polybasic organic acid, e.g., adipic acid, sebacic acid, azelaic acid, and so forth, and an alcohol having a $C_{4-8}$ straight chain or branched structure.

The organic ester plasticizers are not particularly limited and can be exemplified by triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutylcarbitol adipate, ethylene glycol di-2-ethylbutyrate, 1,3-propylene glycol di-2-ethylbutyrate, 1,4-propylene glycol di-2-ethylbutyrate, 1,4-butylene glycol di-2-ethylbutyrate, 1,2-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, tetraethylene glycol di-n-heptanoate, triethylene glycol di-2-ethylbutyrate, triethylene glycol diheptanoate, tetraethylene glycol diheptanoate, dihexyl adipate, dioctyl adipate, hexyl cyclohexyl adipate, diisononyl adipate, heptyl nonyl adipate, dibutyl sebacate, and so forth.

The aforementioned organic phosphate esters are not particularly limited and can be exemplified by tributoxyethyl phosphate, isodecyl phenyl phosphate, triisopropyl phosphate, and so forth.

The plasticizer is preferably at least one selection from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), and triethylene glycol di-n-heptanoate (3G7). More preferred among the preceding are diester compounds such as triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), and triethylene glycol di-n-heptanoate (3G7), wherein triethylene glycol di-2-ethylhexanoate (3GO) is even more preferred.

The lower limit on the plasticizer content in the sound-insulating layer according to the first embodiment is 71 parts by weight with respect to 100 parts by weight of polyvinyl acetal resin A. When the plasticizer content in the sound-insulating layer according to the first embodiment is less than 71 parts by weight, the temperature T1 giving the maximum tan δ value at a frequency of 1 Hz cannot be brought into the range of −30° C. to 0° C. and the sound-insulating performance for solid-borne sound in an environment at 0° C. or below is then reduced. A preferred lower limit for the plasticizer content in the sound-insulating layer according to the first embodiment is 80 parts by weight and a more preferred lower limit is 100 parts by weight.

While there is no particular upper limit on the plasticizer content in the sound-insulating layer according to the first embodiment, a preferred upper limit is 160 parts by weight with respect to 100 parts by weight of polyvinyl acetal resin A. When the plasticizer content in the sound-insulating layer according to the first embodiment exceeds 160 parts by weight, the plasticizer may bleed out and the transparency of the interlayer film for laminated glass may be reduced; in addition, sheet slippage may be produced when the resulting laminated glass is stored propped up in a high temperature ambient. A more preferred upper limit for the plasticizer content in the sound-insulating layer according to the first embodiment is 150 parts by weight, an even more preferred upper limit is 140 parts by weight, and a particularly preferred upper limit is 120 parts by weight.

The sound-insulating layer of the second embodiment contains 50 parts by weight or more of plasticizer with respect to 100 parts by weight of polyvinyl acetal resin that has 5 carbons or more in the acetal group (also referred to hereafter as "polyvinyl acetal resin B"). The present inventors discovered that the glass-transition temperature is sufficiently lowered with polyvinyl acetal resin B, in which the number of carbons in the acetal group is in a special range, that the incorporation of plasticizer at or above a specific amount makes it possible to adjust the temperature T1 giving the maximum tan δ value at a frequency of 1 Hz into the range from −30° C. to 0° C. Because the sound-insulating layer according to the second embodiment contains polyvinyl acetal resin that has 5 carbons or more in the acetal group, it exhibits an excellent sound-insulating performance for solid-borne sound even in an environment at 0° C. or below. The aforementioned polyvinyl acetal resin B can be produced by the acetalation of a polyvinyl alcohol with an aldehyde.

The polyvinyl alcohol can be produced the saponification of a polyvinyl acetate.

The acetal group present in polyvinyl acetal resin B has 5 carbons or more. That is, the aldehyde used to produce polyvinyl acetal resin B is aldehyde that has 5 carbons or more. When the number of carbons in the acetal group in polyvinyl acetal resin B is less than 5, the glass-transition temperature is not adequately lowered and the sound-insulating performance in an environment at 0° C. or below may be diminished unless large amounts of plasticizer are used. There is no particular upper limit on the number of carbons in the acetal group, but 12 is the practical upper limit. The synthesis of polyvinyl acetal resin on an industrial basis using an aldehyde having more than 12 carbons is problematic. Polyvinyl acetal resin in which the number of carbons in the acetal group exceeds 12 is not currently available as a commercial product. A more preferred lower limit on the number of carbons in the acetal group is 6 and a more preferred upper limit is 11.

Aldehydes having 5 or more carbons can be exemplified by n-valeraldehyde, n-hexylaldehyde, 2-ethylhexylaldehyde, 2-ethylbutylaldehyde, n-heptylaldehyde, n-octylaldehyde, n-nonylaldehyde, n-decylaldehyde, benzaldehyde, cinnamaldehyde, n-undecylaldehyde, n-dodecylaldehyde, and so forth. Preferred there among are n-hexylaldehyde, 2-ethylhexylaldehyde, n-octylaldehyde, and n-decylaldehyde. Each of these aldehydes may be used alone or two or more kinds of these may be used in combination.

A preferred lower limit on the quantity of the acetyl group in polyvinyl acetal resin B is 5 mol %. When the quantity of acetyl group in polyvinyl acetal resin B is less than 5 mol %, the compatibility between the plasticizer and polyvinyl acetal resin B is reduced and plasticizer may bleed out. While there is no particular upper limit on the quantity of acetyl group in polyvinyl acetal resin B, the practical upper limit is 30 mol %. A more preferred lower limit on this quantity of acetyl group is 8 mol %, an even more preferred lower limit is 10 mol %, and a particularly preferred lower limit is 12 mol %.

A preferred upper limit on the quantity of hydroxyl group in polyvinyl acetal resin B is 39 mol %. When the quantity of hydroxyl group in polyvinyl acetal resin B exceeds 39 mol %, the compatibility between the plasticizer and polyvinyl acetal resin B is reduced and the plasticizer may bleed out. While there is no particular upper limit on the quantity of hydroxyl group in polyvinyl acetal resin B, the practical lower limit is 10 mol %. A more preferred upper limit on the quantity of hydroxyl group is 35 mol %.

A preferred lower limit on the average degree of polymerization of polyvinyl acetal resin B is 2600, and a preferred upper limit is 5000. When the average degree of polymerization of polyvinyl acetal resin B is less than 2600, the penetration resistance of the laminated glass may decline; in addition, sheet slippage maybe produced when the resulting laminated glass is stored propped up in a high temperature ambient. Molding of the interlayer film for laminated glass is highly problematic when the average degree of polymerization of polyvinyl acetal resin B exceeds 5000. A more preferred lower limit on the average degree of polymerization of the polyvinyl acetal resin B is 2700, and a more preferred upper limit is 3200.

The plasticizer under consideration is not particularly limited, and the same plasticizers as used for the sound-insulating layer of the first embodiment can be used in the present case.

The lower limit on the plasticizer content in the sound-insulating layer according to the second embodiment is 50 parts by weight with respect to 100 parts by weight of polyvinyl acetal resin B. By using this polyvinyl acetal resin B, in which the number of carbons in the acetal group is 5 or more, for the sound-insulating layer according to the second embodiment, the temperature T1 that gives the maximum tan δ value at a frequency of 1 Hz can be adjusted into the range from −30° C. to 0° C.—and a sound-insulating performance for solid-borne sound can be realized in an environment at 0° C. or below—even with the incorporation of less plasticizer than for the sound-insulating layer according to the first embodiment. A preferred lower limit on the plasticizer content in the sound-insulating layer according to the second embodiment is 60 parts by weight.

While there is no particular upper limit on the plasticizer content in the sound-insulating layer according to the second embodiment, a preferred upper limit is 80 parts by weight with respect to 100 parts by weight of polyvinyl acetal resin B. When the plasticizer content in the sound-insulating layer according to the second embodiment exceeds 80 parts by weight, the plasticizer may bleed out and the transparency of the interlayer film for laminated glass may be reduced; in addition, sheet slippage may be produced when the resulting laminated glass is stored propped up in a high temperature ambient. A more preferred upper limit for the plasticizer content in the sound-insulating layer according to the second embodiment is 75 parts by weight.

A preferred lower limit for the thickness of this sound-insulating layer is 20 μm, while a preferred upper limit is 1800 μm. An acceptable sound-insulating performance may not be realized when this sound-insulating layer has a thickness less than 20 μm. When the thickness of this sound-insulating layer exceeds 1800 μm, the thickness of the interlayer film for laminated glass as a whole becomes impractically large. A more preferred lower limit for the thickness of this sound-insulating layer is 50 μm, while a more preferred upper limit is 500 μm.

The interlayer film for laminated glass according to the present invention preferably comprises the sound-insulating layer interposed between two protective layers and laminated in the sequence protective layer, sound-insulating layer, protective layer. This combination of a protective layer with the sound-insulating layer functions to impart a sound-insulating action for solid-borne sound not only in an environment at 0°

C. or below, but also in an environment above 0° C. In the case of the sound-insulating layer according to the first embodiment, the protective layer also functions to prevent the plasticizer from bleeding out from the sound-insulating layer.

The temperature T2, which is the temperature that gives the maximum value of tan δ at a frequency of 1 Hz for the aforementioned protective layer, is preferably greater than the previously described T1 and more preferably is in the range from 0° C. to 40° C. By having this temperature T2 that gives the maximum tan δ value for the protective layer be larger than T1, a sound-insulating action for solid-borne sound is obtained not only in an environment at 0° C. or below, but also in an environment above 0° C. In addition, a sound-insulating action for solid-borne sound in the ambient temperature range is obtained by having this T2 be in the range from 0° C. to 40° C. This ambient temperature range denotes the range from 5° C. to 35° C. A more preferred lower limit for T2 is 3° C. and a more preferred upper limit is 39° C.

This protective layer preferably comprises a polyvinyl acetal resin (also referred to hereafter as "polyvinyl acetal resin C") and a plasticizer.

This polyvinyl acetal resin C can be produced by the acetalation of a polyvinyl alcohol with an aldehyde.

This polyvinyl alcohol can be produced by the saponification of polyvinyl acetate.

A preferred lower limit for the degree of saponification of this polyvinyl alcohol is 80 mol % and a preferred upper limit is 99.8 mol %.

There is no particular limit on the number of carbons in the acetal group in this polyvinyl acetal resin C. That is, there is no particular limit on the aldehyde used to produce polyvinyl acetal resin C, and the same aldehyde can be used as used for polyvinyl acetal resin A or polyvinyl acetal resin B. The number of carbons in the acetal group in polyvinyl acetal resin C is preferably 3 or 4. These aldehydes maybe used alone or two or more kinds of these may be used in combination. The aforementioned polyvinyl acetal resin is preferably a polyvinyl butyral resin.

The quantity of the acetyl group in polyvinyl acetal resin C is preferably 10 mol % or less. An adequate strength is not obtained for the interlayer film for laminated glass when the quantity of the acetyl group exceeds 10 mol %.

In the case of the combination with the sound-insulating layer according to the first embodiment, the quantity of acetyl group in polyvinyl acetal resin C is preferably 3 mol % or less. A polyvinyl acetal resin that contains 3 mol % or less acetyl group has a low compatibility with plasticizer. The use of a protective layer comprising a polyvinyl acetal resin C that has a low compatibility with plasticizer makes it possible to prevent the plasticizer present in large amounts in the sound-insulating layer according to the first embodiment from bleeding out.

A more preferred upper limit for the quantity of acetyl group in polyvinyl acetal resin C is 2.5 mol %.

A preferred lower limit for the degree of acetalation of polyvinyl acetal resin C is 60 mol % and a preferred upper limit is 75 mol %. The use of a protective layer comprising such a polyvinyl acetal resin C makes it possible in particular to prevent bleed out by the large amounts of plasticizer present in the sound-insulating layer according to the first embodiment. The moisture resistance of the protective layer may decline when the degree of acetalation of polyvinyl acetal resin C is less than 60 mol %. The acetalation reaction proceeds with difficulty when the degree of acetalation of polyvinyl acetal resin C exceeds 75 mol %, making such a degree of acetalation disfavored.

The previously cited plasticizers can be used as the plasticizer in the protective layer. The plasticizer used in the protective layer may be the same as the plasticizer used in the sound-insulating layer or may be different from the plasticizer used in the sound-insulating layer.

A preferred lower limit for the plasticizer content in the protective layer is 25 parts by weight with respect to 100 parts by weight of polyvinyl acetal resin C, while a preferred upper limit is 50 parts by weight. When the plasticizer content in the protective layer is less than 25 parts by weight, the penetration resistance of the laminated glass may undergo a substantial decline. When the plasticizer content in the protective layer exceeds 50 parts by weight, the transparency of the interlayer film for laminated glass may be reduced due to plasticizer bleed out from the protective layer. A preferred lower limit for the plasticizer content in the protective layer is 30 parts by weight and a preferred upper limit is 45 parts by weight.

A preferred lower limit on the thickness of the protective layer is 100 μm and a preferred upper limit is 1000 μm. When the protective layer has a thickness less than 100 μm, the sound-insulating performance for solid-borne sound in the ambient temperature range may be reduced and the plasticizer may bleed out from the sound-insulating layer. When the protective layer has a thickness in excess of 1000 μm, the thickness of the interlayer film for laminated glass as a whole may become impractically large. A more preferred lower limit for the thickness of the protective layer is 200 μm and a more preferred upper limit is 500 μm.

As necessary, the aforementioned interlayer film for laminated glass and the aforementioned protective layer may also contain additives such as dispersion assistants, antioxidants, photostabilizers, flame retardants, static inhibitors, adhesion regulators, moisture resistance agents, heat reflecting agents, heat absorbing agents, fluorescent bleaching agents, blue pigments, and so forth.

When the interlayer film for laminated glass of the present invention comprises the aforementioned sound-insulating layer and the aforementioned protective layer, the sound-insulating layer may have a region 1, for which the aforementioned temperature T1 giving the maximum tan δ value at a frequency of 1 Hz is in the range from −30° C. to 0° C., in a horizontal arrangement with a region 2 comprising the resin composition that constitutes the aforementioned protective layer. The generation of sheet slippage can be effectively prevented by using such a structure for the sound-insulating layer.

The arrangement of this region 1 and region 2 is not particularly limited, and, for example, a stripe-shaped region 1 and a stripe-shaped region 2 may be disposed in alternation, or the region 1 may be disposed centrally and the region 2 may be disposed peripherally so as to encircle the region 1.

The interlayer film for laminated glass of the present invention may additionally contain other layers on an optional basis. For example, a heat-shielding function can be imparted to the interlayer film for laminated glass of the present invention when a layer containing heat-absorbing particles is present as an additional layer.

A preferred lower limit on the thickness of the interlayer film for laminated glass of the present invention is 300 μm and a preferred upper limit is 2000 μm. A satisfactory sound-insulating performance for solid-borne sound and a satisfactory penetration resistance may not be obtained when the interlayer film for laminated glass of the present invention has a thickness below 300 μm. The thickness of commercially practical laminated glass may end up being exceeded when the interlayer film for laminated glass of the present invention has a thickness greater than 2000 μm. A more preferred lower limit for the thickness of the interlayer film for laminated glass of the present invention is 400 µm, and a more preferred upper limit is 1200 µm.

There are no particular limitations on the method of producing the interlayer film for laminated glass of the present invention. As examples, a resin composition for forming the sound-insulating layer and a resin composition for forming the protective layer can be individually prepared and then co-extruded; or, these may be individually converted into a sheet by extrusion or press molding followed by lamination and conversion into a single body.

The present invention also encompasses laminated glass in which the interlayer film for laminated glass of the present invention is interposed between two transparent sheets. The laminated glass of the present invention may also be used as part of double glass.

The transparent sheets used in the laminated glass according to the present invention are not particularly limited, and the transparent glass sheets in ordinary use can be used here. Examples are inorganic glasses such as float plate glass, polished plate glass, molded plate glass, meshed plate glass, wired plate glass, colored plate glass, heat absorbent glass, heat reflecting glass, green glass, and so forth. Also usable are organic plastic plates of, e.g., polycarbonate, polyacrylate, and so forth.

Two or more kinds of glass sheet can be used as the aforementioned glass sheet. An example in this regard is laminated glass obtained by interposing an interlayer film for laminated glass according to the present invention between transparent float plate glass and a colored plate glass such as green glass. Another example is laminated glass obtained by interposing an interlayer film for laminated glass according to the present invention between an inorganic glass as described above and an organic plastic sheet as described above.

When used as automotive glass, the laminated glass of the present invention can be used as windshield glass, side window glass, rear window glass, roof glass, and panoramic roof glass.

There are no particular limitations on the method of producing laminated glass according to the present invention, and the heretofore known methods of production can be used to produce this laminated glass.

Effects of the Invention

The present invention can provide an interlayer film for laminated glass that exhibits an excellent sound-insulating performance for solid-borne sound in an environment at or below 0° C. The present invention can also provide laminated glass that is obtained using this interlayer film for laminated glass.

BEST MODE FOR CARRYING OUT THE INVENTION

The embodiments of the present invention are more particularly described in the following using examples, but the present invention is not limited only to these examples.

EXAMPLE 1

(1) Preparation of Resin Composition A

A sound-insulating layer resin composition A was prepared by adding 71 parts by weight of triethylene glycol di-2-ethylhexanoate (3GO) as plasticizer to 100 parts by weight of polyvinyl butyral resin having 4 carbons in the acetal group, an acetyl group quantity of 13 mol %, a hydroxyl group quantity of 22.5 mol %, and an average degree of polymerization of 2300, and thoroughly mixing/kneading using a mixing roll.

A polyvinyl butyral resin obtained by acetalation with n-butylaldehyde was used here.

(2) Preparation of Resin Composition C

A protective layer resin composition C was prepared by adding 30.5 parts by weight of triethylene glycol di-2-ethylhexanoate (3GO) as plasticizer to 100 parts by weight of polyvinyl butyral resin having 4 carbons in the acetal group, an acetyl group quantity of 1 mol %, and a degree of butyralization of 65 mol %, and thoroughly mixing/kneading using a mixing roll.

A polyvinyl butyral resin obtained by acetalation with n-butylaldehyde was used here.

(3) Fabrication of an Interlayer Film for Laminated Glass

A resin composition sheet A having a thickness of 0.1 mm was obtained by sandwiching the resin composition A between two Teflon (registered trademark) sheets with an interposed 0.1 mm clearance sheet and press molding at 150° C.

A resin composition sheet C having a thickness of 0.35 mm was obtained by sandwiching the resin composition C between two Teflon (registered trademark) sheets with an interposed 0.35 mm clearance sheet and press molding at 150° C.

The obtained resin composition sheets A and C were laminated in the sequence C/A/C. A 0.8 mm-thick interlayer film for laminated glass was then obtained by sandwiching this laminate between two Teflon (registered trademark) sheets with an interposed 0.8 mm clearance sheet and press molding at 150° C.

EXAMPLES 2 TO 27 AND COMPARATIVE EXAMPLE 1

Interlayer films for laminated glass were obtained as in Example 1, but using the type of polyvinyl acetal resin for resin composition A and the quantity of plasticizer incorporation as shown in Tables 1 to 4.

For Example 20, a polyvinyl acetal resin provided by acetalation with propionaldehyde was used in place of the polyvinyl butyral resin in the preparation of resin composition A according to Example 2.

EXAMPLE 28

An interlayer film for laminated glass was obtained as in Example 5, but in this case using triethylene glycol di-2-ethylbutyrate (3GH) as the plasticizer in the preparation of resin composition A and resin composition C.

EXAMPLE 29

An interlayer film for laminated glass was obtained as in Example 5, but in this case using triethylene glycol di-n-heptanoate (3G7) as the plasticizer in the preparation of resin composition A and resin composition C.

EXAMPLE 30

An interlayer film for laminated glass was obtained as in Example 5, but in this case using tetraethylene glycol di-2- ethylhexanoate (4GO) as the plasticizer in the preparation of resin composition A and resin composition C.

EXAMPLE 31

An interlayer film for laminated glass was obtained as in Example 5, but in this case using tetraethylene glycol di-2-ethylbutyrate (4GH) as the plasticizer in the preparation of resin composition A and resin composition C.

EXAMPLE 32

An interlayer film for laminated glass was obtained as in Example 5, but in this case using tetraethylene glycol di-n-heptanoate (4G7) as the plasticizer in the preparation of resin composition A and resin composition C.

(Evaluations)

The interlayer films for laminated glass obtained in the examples and comparative examples were evaluated as follows. The results are given in Tables 1 to 4.

(1) Measurement of the Temperatures T1 and T2 that give the Maximum Value of Tan δ at a Frequency of 1 Hz The resin compositions A, B, and C obtained in the examples and comparative examples were each press molded at 150° C. to fabricate the 0.8 mm-thick sheet. A circle with a diameter of 8 mm was then cut from this sheet to produce a test sheet. The temperatures T1 and T2 giving the maximum tan δ value at a frequency of 1 Hz were measured by measuring tan δ by temperature sweep measurement of the dynamic viscoelasticity of the test sheet using a shear procedure at a rate of temperature rise of 3° C./minute, a frequency of 1 Hz, and a strain rate of 1.0% using a viscoelasticity measurement instrument ("ARES" manufactured by Rheometric Scientific Inc.).

(2) Evaluation of the Loss Factor

The obtained interlayer film for laminated glass was cut to length 30 mm×width 320 mm and was sandwiched by two sheets of transparent float glass (length 25 mm×width 305 mm×thickness 2.0 mm) and vacuum pressing was performed with a vacuum laminator by holding for 30 minutes at 90° C. The evaluation sample was fabricated by cutting off the interlayer film for laminated glass that had exuded from the glass.

The loss factor was measured on the obtained evaluation sample by a central vibration technique at 0° C. using an "SA-01" measurement instrument from RION Co., Ltd. The loss factor for the first mode (around 100 Hz) of the resonance frequency of the obtained loss factor was evaluated.

(3) Evaluation of Sheet Slippage

The obtained laminated glass interlayer film (15×30 cm) was sandwiched by two sheets of transparent float glass (length 15 cm×width 30 cm×thickness 2.0 mm), and the evaluation sample was obtained by vacuum pressing using a vacuum laminator by holding for 30 minutes at 90° C.

One side of the obtained evaluation sample was fixed to a vertical surface and float glass (15 cm×30 cm×thickness 15 mm) was bonded to the other side using double-sided tape. A reference line was drawn on the side of the laminated glass in order to measure the amount of slippage and the assembly was held for 30 days in an 80° C. environment. The amount of slippage for the two glass sheets in the evaluation sample was measured after the 30 days had passed.

(4) Evaluation of Bleed Out

The obtained interlayer film for laminated glass was cut to length 100 mm×width 100 mm and was stacked in the sequence glass/PET film/interlayer film for laminated glass/PET film/glass using a release-treated 100 μm-thick PET film (length 100 mm×width 100 mm) and transparent float glass (length 100 mm×width 100 mm); vacuum pressing was performed with a vacuum laminator by holding for 30 minutes at 90° C. After this, the glass and PET film were removed and the interlayer film for laminated glass was recovered and 5 lines with a length of 8 cm were drawn in a 23° C. environment on the surface of the interlayer film for laminated glass using an oil-based marking pen. The interlayer film for laminated glass was then stored for 4 weeks at 23° C. The interlayer film for laminated glass was subsequently visually evaluated using the following scale: a score of "double concentric circles" was rendered when all of the lines were unblurred even after storage for 4 weeks; a score of "open circle" was rendered when all the lines were unblurred after storage for 3 weeks, but at least one of the lines was blurred after storage for 4 weeks; and a score of "open triangle" was rendered when all of the lines were unblurred after storage for 2 weeks, but at least one of the lines was blurred after storage for 3 weeks.

TABLE 1

| | | Example 1 | Example 2 | Example 3 | Example 4 | Example 5 | Example 6 | Example 7 | Example 8 |
|---|---|---|---|---|---|---|---|---|---|
| resin layer A | number of carbons | 4 | 4 | 4 | 4 | 4 | 4 | 4 | 4 |
| | quantity of acetyl group/mol % | 13 | 13 | 13 | 13 | 13 | 13 | 13 | 13 |
| | quantity of hydroxyl group/mol % | 22.5 | 22.5 | 22.5 | 22.5 | 22.5 | 22.5 | 22.5 | 19.7 |
| | average degree of polymerization | 2300 | 2300 | 2300 | 2300 | 2700 | 3000 | 3500 | 2700 |
| | quantity of plasticizer/phr | 71 | 80 | 100 | 120 | 80 | 100 | 140 | 80 |
| resin layer B | number of carbons | — | — | — | — | — | — | — | — |
| | quantity of acetyl group/mol % | — | — | — | — | — | — | — | — |
| | quantity of hydroxyl group/mol % | — | — | — | — | — | — | — | — |
| | average degree of polymerization | — | — | — | — | — | — | — | — |
| | quantity of plasticizer/phr | — | — | — | — | — | — | — | — |
| resin layer C | degree of butyralization/mol % | 68.5 | 68.5 | 68.5 | 68.5 | 68.5 | 68.5 | 68.5 | 68.5 |
| | quantity of acetyl group/mol % | 1 | 1 | 1 | 1 | 1 | 1 | 1 | 1 |
| | quantity of plasticizer/phr | 40 | 40 | 40 | 40 | 40 | 40 | 40 | 40 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| temperature giving the maximum value of tan δ at a frequency of 1 Hz | resin layer A | −0.5 | −5.6 | −13.1 | −17.6 | −5.2 | −12.4 | −21.3 | −4.8 |
|  | resin layer B | — | — | — | — | — | — | — | — |
|  | resin layer C | 30.5 | 30.5 | 30.5 | 30.5 | 30.5 | 30.5 | 30.5 | 30.5 |
| loss factor (0° C., around 100 Hz) |  | 0.12 | 0.21 | 0.27 | 0.34 | 0.2 | 0.25 | 0.28 | 0.21 |
| sheet slippage/mm |  | 0.4 | 1.2 | 1.8 | 2.4 | 0.2 | 0.1 | 0.3 | 0.2 |
| bleed out |  | ◎ | ○ | ○ | ○ | ○ | ○ | ○ | ◎ |

TABLE 2

|  |  | Example 9 | Example 10 | Example 11 | Example 12 | Example 13 | Example 14 | Example 15 | Example 16 |
|---|---|---|---|---|---|---|---|---|---|
| resin layer A | number of carbons | 4 | 4 | 4 | 4 | 4 | 4 | 4 | 4 |
|  | quantity of acetyl group/mol % | 1.3 | 5.1 | 8.9 | 13 | 13 | 17.6 | 21.8 | 30 |
|  | quantity of hydroxyl group/mol % | 13.5 | 18.5 | 20 | 20 | 18.5 | 30.5 | 34.5 | 38.5 |
|  | average degree of polymerization | 2700 | 2700 | 2700 | 2700 | 2700 | 2700 | 2700 | 2700 |
|  | quantity of plasticizer/phr | 80 | 80 | 80 | 80 | 80 | 80 | 80 | 80 |
| resin layer B | number of carbons | — | — | — | — | — | — | — | — |
|  | quantity of acetyl group/mol % | — | — | — | — | — | — | — | — |
|  | quantity of hydroxyl group/mol % | — | — | — | — | — | — | — | — |
|  | average degree of polymerization | — | — | — | — | — | — | — | — |
|  | quantity of plasticizer/phr | — | — | — | — | — | — | — | — |
| resin layer C | degree of butyralization/mol % | 68.5 | 68.5 | 68.5 | 68.5 | 68.5 | 68.5 | 68.5 | 68.5 |
|  | quantity of acetyl group/mol % | 1 | 1 | 1 | 1 | 1 | 1 | 1 | 1 |
|  | quantity of plasticizer/phr | 40 | 40 | 40 | 40 | 40 | 40 | 40 | 40 |
| temperature giving the maximum value of tan δ at a frequency of 1 Hz | resin layer A | −8.1 | −5.7 | −6.5 | −5.5 | −10.2 | −5.3 | −5.5 | −4.5 |
|  | resin layer B | — | — | — | — | — | — | — | — |
|  | resin layer C | 30.5 | 30.5 | 30.5 | 30.5 | 30.5 | 30.5 | 30.5 | 30.5 |
| loss factor (0° C., around 100 Hz) |  | 0.23 | 0.21 | 0.22 | 0.21 | 0.26 | 0.23 | 0.23 | 0.22 |
| sheet slippage/mm |  | 0.4 | 0.2 | 0.2 | 0.2 | 0.5 | 0.2 | 0.2 | 0.2 |
| bleed out |  | ◎ | ◎ | ◎ | ◎ | ◎ | ◎ | ◎ | ◎ |

TABLE 3

|  |  | Example 17 | Example 18 | Example 19 | Example 20 | Example 21 | Example 22 | Example 23 | Example 24 |
|---|---|---|---|---|---|---|---|---|---|
| resin layer A | number of carbons | 4 | 4 | 4 | 3 | 4 | 4 | 4 | 4 |
|  | quantity of acetyl group/mol % | 17.6 | 21.8 | 13 | 13 | 13 | 13 | 13 | 15 |
|  | quantity of hydroxyl group/mol % | 33.5 | 36.2 | 22.5 | 22.5 | 22.5 | 22.5 | 21.5 | 23.5 |
|  | average degree of polymerization | 2700 | 2700 | 2300 | 2300 | 2300 | 2600 | 2700 | 2700 |
|  | quantity of plasticizer/phr | 100 | 100 | 160 | 80 | 150 | 80 | 80 | 80 |
| resin layer B | number of carbons | — | — | — | — | — | — | — | — |
|  | quantity of acetyl group/mol % | — | — | — | — | — | — | — | — |
|  | quantity of hydroxyl group/mol % | — | — | — | — | — | — | — | — |
|  | average degree of polymerization | — | — | — | — | — | — | — | — |
|  | quantity of plasticizer/phr | — | — | — | — | — | — | — | — |
| resin layer C | degree of butyralization/mol % | 68.5 | 68.5 | 68.5 | 68.5 | 68.5 | 68.5 | 68.5 | 68.5 |
|  | quantity of acetyl group/mol % | 1 | 1 | 1 | 1 | 1 | 1 | 1 | 1 |
|  | quantity of plasticizer/phr | 40 | 40 | 40 | 40 | 40 | 40 | 40 | 40 |

TABLE 3-continued

|  |  | Example 17 | Example 18 | Example 19 | Example 20 | Example 21 | Example 22 | Example 23 | Example 24 |
|---|---|---|---|---|---|---|---|---|---|
| temperature giving the maximum value of tan δ at a frequency of 1 Hz | resin layer A | −7.8 | −10.5 | −24.2 | −2.1 | −22.5 | −5.4 | −7.5 | −5.5 |
|  | resin layer B | — | — | — | — | — | — | — | — |
|  | resin layer C | 30.5 | 30.5 | 30.5 | 30.5 | 30.5 | 30.5 | 30.5 | 30.5 |
| loss factor (0° C., around 100 Hz) |  | 0.26 | 0.3 | 0.21 | 0.17 | 0.23 | 0.21 | 0.26 | 0.23 |
| sheet slippage/mm |  | 0.4 | 0.4 | 5.2 | 1 | 4.6 | 0.5 | 0.2 | 0.2 |
| bleed out |  | ◎ | ◎ | Δ | ○ | ○ | ○ | ◎ | ◎ |

TABLE 4

|  |  | Example 25 | Example 26 | Example 27 | Example 28 | Example 29 | Example 30 | Example 31 | Example 32 | Comparative Example 1 |
|---|---|---|---|---|---|---|---|---|---|---|
| resin layer A | number of carbons | 4 | 4 | 4 | 4 | 4 | 4 | 4 | 4 | 4 |
|  | quantity of acetyl group/mol % | 13 | 13 | 13 | 13 | 13 | 13 | 13 | 13 | 13 |
|  | quantity of hydroxyl group/mol % | 22.5 | 22.5 | 19.5 | 22.5 | 22.5 | 22.5 | 22.5 | 22.5 | 22.5 |
|  | average degree of polymerization | 2700 | 2700 | 3200 | 2700 | 2700 | 2700 | 2700 | 2700 | 2300 |
|  | quantity of plasticizer/phr | 100 | 80 | 160 | 80 | 80 | 80 | 80 | 80 | 60 |
| resin layer B | number of carbons | — | — | — | — | — | — | — | — | — |
|  | quantity of acetyl group/mol % | — | — | — | — | — | — | — | — | — |
|  | quantity of hydroxyl group/mol % | — | — | — | — | — | — | — | — | — |
|  | average degree of polymerization | — | — | — | — | — | — | — | — | — |
|  | quantity of plasticizer/phr | — | — | — | — | — | — | — | — | — |
| resin layer C | degree of butyralization/mol % | 70 | 70 | 68.5 | 68.5 | 68.5 | 68.5 | 68.5 | 68.5 | 68.5 |
|  | quantity of acetyl group/mol % | 10 | 10 | 1 | 1 | 1 | 1 | 1 | 1 | 1 |
|  | quantity of plasticizer/phr | 50 | 25 | 40 | 40 | 40 | 40 | 40 | 40 | 40 |
| temperature giving the maximum value of tan δ at a frequency of 1 Hz | resin layer A | −13.1 | −5.2 | −29 | −6.2 | −6 | −5 | −5.5 | −5.8 | 2.8 |
|  | resin layer B | — | — | — | — | — | — | — | — | — |
|  | resin layer C | 3.6 | 38.6 | 30.5 | 30.5 | 30.5 | 30.5 | 30.5 | 30.5 | 30.5 |
| loss factor (0° C., around 100 Hz) |  | 0.25 | 0.19 | 0.17 | 0.22 | 0.21 | 0.21 | 0.21 | 0.21 | 0.08 |
| sheet slippage/mm |  | 0.2 | 0.2 | 1.4 | 0.2 | 0.2 | 0.2 | 0.2 | 0.2 | 0.08 |
| bleed out |  | ○ | ○ | Δ | ○ | ○ | ○ | ○ | ○ | ◎ |

EXAMPLE 33

(1) Preparation of Resin Composition B

A sound-insulating layer resin composition A was prepared by adding 60 parts by weight of triethylene glycol di-2-ethylhexanoate (3GO) as plasticizer to 100 parts by weight of polyvinyl acetal resin having 5 carbons in the acetal group, an acetyl group quantity of 13 mol %, a hydroxyl group quantity of 22.5 mol %, and an average degree of polymerization of 2300, and thoroughly mixing/kneading using a mixing roll.

A polyvinyl acetal resin obtained by acetalation with n-valeraldehyde was used here.

(2) Preparation of Resin Composition C

A protective layer resin composition C was prepared by adding 30.5 parts by weight of triethylene glycol di-2-ethylhexanoate (3GO) as plasticizer to 100 parts by weight of polyvinyl butyral resin having 4 carbons in the acetal group, an acetyl group quantity of 1 mol %, and a degree of butyralization of 65 mol %, and thoroughly mixing/kneading using a mixing roll.

A polyvinyl butyral resin obtained by acetalation with n-butylaldehyde was used here.

(3) Fabrication of an Interlayer Film for Laminated Glass

A resin composition sheet B having a thickness of 0.1 mm was obtained by sandwiching the resin composition B between two Teflon (registered trademark) sheets with an interposed 0.1 mm clearance sheet and press molding at 150° C. A resin composition sheet C having a thickness of 0.35 mm was obtained by sandwiching the resin composition C between two Teflon (registered trademark) sheets with an interposed 0.35 mm clearance sheet and press molding at 150° C.

The obtained resin composition sheets B and C were laminated in the sequence C/B/C. A 0.8 mm-thick interlayer film for laminated glass was then obtained by sandwiching this laminate between two Teflon (registered trademark) sheets with an interposed 0.8 mm clearance sheet and press molding at 150° C.

Examples 34 to 51 and Comparative Examples 2 and 3

Interlayer films for laminated glass were obtained as in Example 1, but using the type of polyvinyl acetal resin for resin composition B and the quantity of plasticizer incorporation as shown in Tables 4 to 6. The same evaluations as in Example 1 were also performed. The results are given in Tables 5 to 7.

Polyvinyl acetal resin obtained by acetalation with n-valeraldehyde was used for the polyvinyl acetal resin that contained 5 carbons in the acetal group. Polyvinyl acetal resin obtained by acetalation with n-hexylaldehyde was used for the polyvinyl acetal resin that contained 6 carbons in the acetal group. Polyvinyl acetal resin obtained by acetalation with n-heptylaldehyde was used for the polyvinyl acetal resin that contained 7 carbons in the acetal group. Polyvinyl acetal resin obtained by acetalation with n-octylaldehyde was used for the polyvinyl acetal resin that contained 8 carbons in the acetal group. Polyvinyl acetal resin obtained by acetalation with n-nonylaldehyde was used for the polyvinyl acetal resin that contained 9 carbons in the acetal group. Polyvinyl acetal resin obtained by acetalation with n-decylaldehyde was used for the polyvinyl acetal resin that contained 10 carbons in the acetal group. Polyvinyl acetal resin obtained by acetalation with n-undecylaldehyde was used for the polyvinyl acetal resin that contained 11 carbons in the acetal group. Polyvinyl acetal resin obtained by acetalation with n-dodecylaldehyde was used for the polyvinyl acetal resin that contained 12 carbons in the acetal group.

TABLE 5

| | | Example 33 | Example 34 | Example 35 | Example 36 | Example 37 | Example 38 | Example 39 | Example 40 |
|---|---|---|---|---|---|---|---|---|---|
| resin layer A | number of carbons | — | — | — | — | — | — | — | — |
| | quantity of acetyl group/mol % | — | — | — | — | — | — | — | — |
| | quantity of hydroxyl group/mol % | — | — | — | — | — | — | — | — |
| | average degree of polymerization | — | — | — | — | — | — | — | — |
| | quantity of plasticizer/phr | — | — | — | — | — | — | — | — |
| resin layer B | number of carbons | 5 | 6 | 7 | 8 | 9 | 10 | 11 | 12 |
| | quantity of acetyl group/mol % | 13 | 13 | 13 | 13 | 13 | 13 | 13 | 13 |
| | quantity of hydroxyl group/mol % | 22.5 | 30.5 | 31.2 | 34.5 | 32.8 | 33.9 | 34.6 | 35 |
| | average degree of polymerization | 2300 | 2300 | 2300 | 2300 | 2300 | 2300 | 2300 | 2300 |
| | quantity of plasticizer/phr | 60 | 60 | 60 | 60 | 50 | 50 | 50 | 50 |
| resin layer C | degree of butyralization/mol % | 68.5 | 68.5 | 68.5 | 68.5 | 68.5 | 68.5 | 68.5 | 68.5 |
| | quantity of acetyl group/mol % | 1 | 1 | 1 | 1 | 1 | 1 | 1 | 1 |
| | quantity of plasticizer/phr | 40 | 40 | 40 | 40 | 40 | 40 | 40 | 40 |
| temperature giving the maximum value of tan δ at a frequency of 1 Hz | resin layer A | — | — | — | — | — | — | — | — |
| | resin layer B | −8.8 | −7.4 | −6.5 | −5.5 | −2.8 | −3.5 | −4.4 | −3.8 |
| | resin layer C | 30.5 | 30.5 | 30.5 | 30.5 | 30.5 | 30.5 | 30.5 | 30.5 |
| loss factor (around 100 Hz) | | 0.26 | 0.25 | 0.24 | 0.22 | 0.19 | 0.2 | 0.22 | 0.2 |
| sheet slippage/mm | | 1.4 | 1.3 | 1.3 | 1.3 | 0.8 | 0.6 | 0.6 | 0.6 |
| bleed out | | ◎ | ◎ | ◎ | ◎ | ◎ | ◎ | ◎ | ◎ |

TABLE 6

| | | Example 41 | Example 42 | Example 43 | Example 44 | Example 45 | Example 46 | Example 47 | Example 48 |
|---|---|---|---|---|---|---|---|---|---|
| resin layer A | number of carbons | — | — | — | — | — | — | — | — |
| | quantity of acetyl group/mol % | — | — | — | — | — | — | — | — |
| | quantity of hydroxyl group/mol % | — | — | — | — | — | — | — | — |
| | average degree of polymerization | — | — | — | — | — | — | — | — |
| | quantity of plasticizer/phr | — | — | — | — | — | — | — | — |
| resin layer B | number of carbons | 6 | 6 | 6 | 6 | 6 | 6 | 6 | 6 |
| | quantity of acetyl group/mol % | 13 | 13 | 13 | 5.1 | 8.9 | 17.6 | 21.8 | 30 |
| | quantity of hydroxyl group/mol % | 40 | 35 | 26.5 | 29.4 | 30.5 | 32.5 | 34.5 | 39 |
| | average degree of polymerization | 3200 | 2700 | 2100 | 2700 | 2700 | 2700 | 2700 | 2700 |

TABLE 6-continued

|  |  | Example 41 | Example 42 | Example 43 | Example 44 | Example 45 | Example 46 | Example 47 | Example 48 |
|---|---|---|---|---|---|---|---|---|---|
|  | quantity of plasticizer/phr | 100 | 80 | 50 | 60 | 60 | 60 | 60 | 60 |
| resin layer C | degree of butyralization/mol % | 68.5 | 68.5 | 68.5 | 68.5 | 68.5 | 68.5 | 68.5 | 68.5 |
|  | quantity of acetyl group/mol % | 1 | 1 | 1 | 1 | 1 | 1 | 1 | 1 |
|  | quantity of plasticizer/phr | 40 | 40 | 40 | 40 | 40 | 40 | 40 | 40 |
| temperature giving the | resin layer A | — | — | — | — | — | — | — | — |
| maximum value of tan δ | resin layer B | -12.8 | -10.5 | -4.5 | -3.2 | -4.5 | -7.3 | -7.9 | -6.8 |
| at a frequency of 1 Hz | resin layer C | 30.5 | 30.5 | 30.5 | 30.5 | 30.5 | 30.5 | 30.5 | 30.5 |
| loss factor (around 100 Hz) |  | 0.33 | 0.29 | 0.22 | 0.15 | 0.17 | 0.25 | 0.27 | 0.25 |
| sheet slippage/mm |  | 0.1 | 0.2 | 1.7 | 0.1 | 0.1 | 0.2 | 0.2 | 0.2 |
| bleed out |  | ○ | ◎ | ◎ | ◎ | ◎ | ◎ | ◎ | ◎ |

TABLE 7

|  |  | Example 49 | Example 50 | Example 51 | Comparative Example 2 | Comparative Example 3 |
|---|---|---|---|---|---|---|
| resin layer A | number of carbons | — | — | — | — | — |
|  | quantity of acetyl group/mol % | — | — | — | — | — |
|  | quantity of hydroxyl group/mol % | — | — | — | — | — |
|  | average degree of polymerization | — | — | — | — | — |
|  | quantity of plasticizer/phr | — | — | — | — | — |
| resin layer B | number of carbons | 8 | 8 | 6 | 5 | 8 |
|  | quantity of acetyl group/mol % | 17.6 | 21.8 | 13 | 13 | 13 |
|  | quantity of hydroxyl group/mol % | 35.5 | 38.5 | 30.5 | 34.5 | 26.5 |
|  | average degree of polymerization | 2700 | 2700 | 2600 | 2300 | 2300 |
|  | quantity of plasticizer/phr | 60 | 60 | 60 | 45 | 120 |
| resin layer C | degree of butyralization/mol % | 68.5 | 68.5 | 68.5 | 68.5 | 68.5 |
|  | quantity of acetyl group/mol % | 1 | 1 | 1 | 1 | 1 |
|  | quantity of plasticizer/phr | 40 | 40 | 40 | 40 | 40 |
| temperature giving the | resin layer A | — | — | — | — | — |
| maximum value of tan δ | resin layer B | -8 | -9.3 | -7.1 | 3.4 | -30.2 |
| at a frequency of 1 Hz | resin layer C | 30.5 | 30.5 | 30.5 | 30.5 | 30.5 |
| loss factor (around 100 Hz) |  | 0.3 | 0.31 | 0.25 | 0.08 | 0.08 |
| sheet slippage/mm |  | 0.2 | 0.2 | 0.4 | 0 | 12.2 |
| bleed out |  | ◎ | ◎ | ◎ | ◎ | X |

INDUSTRIAL APPLICABILITY

The present invention can provide an interlayer film for laminated glass, that exhibits an excellent sound-insulating performance for solid-borne sound in an environment at or below 0° C. In addition, the present invention can provide laminated glass that is obtained using this interlayer film for laminated glass.

The invention claimed is:

1. An interlayer film for laminated glass,
comprising a sound-insulating layer for which a temperature T1, which is a temperature that gives a maximum value of tan δ at a frequency of 1 Hz, is in a range from −30° C. to 0° C.,
wherein the sound-insulating layer contains 80 parts by weight or more of plasticizer with respect to 100 parts by weight of polyvinyl acetal resin that has 3 or 4 carbons in an acetal group, and
wherein the sound-insulating layer is interposed between two protective layers, and the temperature T2, which is the temperature that gives the maximum value of tan δ for the protective layer at a frequency of 1 Hz, is greater than T1.

2. The interlayer film for laminated glass according to claim 1,
wherein the plasticizer content is 160 parts by weight or less with respect to 100 parts by weight of the polyvinyl acetal resin that has 3 or 4 carbons in the acetal group.

3. The interlayer film for laminated glass according to claim 1,
wherein the polyvinyl acetal resin that has 3 or 4 carbons in the acetal group has an average degree of polymerization of 2600 or more.

4. The interlayer film for laminated glass according to claim 1,
wherein a quantity of the hydroxyl group in the polyvinyl acetal resin that has 3 or 4 carbons in the acetal group is 21.5 mol % or less.

5. The interlayer film for laminated glass according to claim 1,
wherein a quantity of the acetyl group in the polyvinyl acetal resin that has 3 or 4 carbons in the acetal group is 15 mol % or more.

6. An interlayer film for laminated glass,
comprising a sound-insulating layer for which a temperature T1, which is a temperature that give a maximum value of tan δ at a frequency of 1 Hz, is in a range from −30° C. to 0° C.
wherein the sound-insulating layer contains 50 parts by weight or more of plasticizer with respect to 100 parts by weight of polyvinyl acetal resin that has 7 or more carbons in the acetal group, and
wherein the sound-insulating layer is interposed between two protective layers, and the temperature T2, which is the temperature that gives the maximum value of tan δ for the protective layer at a frequency of 1 Hz, is greater than 1.

7. The interlayer film for laminated glass according to claim 6,
wherein the plasticizer content is 80 parts by weight or less with respect to 100 parts by weight of the polyvinyl acetal resin that has 7 or more carbons in the acetal group.

8. The interlayer film for laminated glass according to claim 6,
wherein the polyvinyl acetal resin that has 7 or more carbons in the acetal group has an average degree of polymerization of 2600 or more.

9. The interlayer film for laminated glass according to claim 6,
wherein the quantity of the hydroxyl group in the polyvinyl acetal resin that has 7 or more carbons in the acetal group is 39 mol % or less.

10. The interlayer film for laminated glass according to claim 6,
wherein the quantity of the acetyl group in the polyvinyl acetal resin that has 7 or more carbons in the acetal group is 5 mol % or more.

11. The interlayer film for laminated glass according to claim 1,
wherein the temperature T2, which is the temperature that gives the maximum value of tan δ for the protective layer at a frequency of 1 Hz, is in the range from 0° C. to 40° C.

12. The interlayer film for laminated glass according to claim 1,
wherein the protective layer contains 25 to 50 parts by weight of plasticizer with respect to 100 parts by weight of a polyvinyl acetal resin in which the acetal group has 3 or 4 carbons, the degree of acetalation is 60 to 75 mol %, and the quantity of acetyl group is 10 mol % or less.

13. A laminated glass,
which comprises the interlayer film for laminated glass according to claim 1 interposed between two transparent sheets.

14. The interlayer film for laminated glass according to claim 6,
wherein the temperature T2, which is the temperature that gives the maximum value of tan δ for the protective layer at a frequency of 1 Hz, is in the range from 0° C. to 40° C.

15. The interlayer film for laminated glass according to claim 6,
wherein the protective layer contains 25 to 50 parts by weight of plasticizer with respect to 100 parts by weight of a polyvinyl acetal resin in which the acetal group has 3 or 4 carbons, the degree of acetalation is 60 to 75 mol %, and the quantity of acetyl group is 10 mol % or less.

16. A laminated glass,
which comprises the interlayer film for laminated glass according to claim 1, interposed between two transparent sheets.

* * * * *